US008946951B2

(12) United States Patent
Mahfoudh et al.

(10) Patent No.: US 8,946,951 B2
(45) Date of Patent: Feb. 3, 2015

(54) FAN MODULE

(71) Applicant: Robert Bosch GmbH, Stuttgart (DE)

(72) Inventors: Samir Mahfoudh, Beuhl (DE);
Sebastian Hansen, Sasbach (DE); Asli Arslan-Huerst, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 13/650,894

(22) Filed: Oct. 12, 2012

(65) Prior Publication Data

US 2013/0093292 A1 Apr. 18, 2013

(30) Foreign Application Priority Data

Oct. 14, 2011 (DE) .......................... 10 2011 084 491

(51) Int. Cl.
| H02K 7/14 | (2006.01) |
| F04D 29/32 | (2006.01) |
| H02K 1/27 | (2006.01) |
| F04D 29/52 | (2006.01) |
| F04D 29/64 | (2006.01) |
| H02K 9/06 | (2006.01) |
| H02K 15/12 | (2006.01) |
| F01P 3/04 | (2006.01) |

(52) U.S. Cl.
CPC ................ *F04D 29/329* (2013.01); *H02K 7/14* (2013.01); *H02K 1/2786* (2013.01); *F04D 29/522* (2013.01); *F04D 29/646* (2013.01); *H02K 9/06* (2013.01); *H02K 15/12* (2013.01); *F01P 3/04* (2013.01)
USPC .................................. 310/62; 310/63; 310/64

(58) Field of Classification Search
USPC ............ 310/62, 63, 67 R, 64; 416/95, 170 R; 415/220
See application file for complete search history.

(56) References Cited

U.S. PATENT DOCUMENTS

| 5,454,695 | A | * | 10/1995 | Shah et al. ..................... 416/203 |
| 6,655,929 | B2 | * | 12/2003 | Hsieh .............................. 417/368 |
| 8,251,674 | B1 | * | 8/2012 | Pairaktaridis ................. 417/354 |
| 8,267,673 | B1 | * | 9/2012 | Pairaktaridis ................. 417/354 |
| 2005/0186070 | A1 | * | 8/2005 | Zeng et al. .................. 415/211.2 |
| 2007/0090710 | A1 | * | 4/2007 | Chen ........................ 310/156.26 |
| 2009/0184593 | A1 | * | 7/2009 | Kaizu .............................. 310/62 |

* cited by examiner

*Primary Examiner* — Quyen Leung
*Assistant Examiner* — Naishadh Desai
(74) *Attorney, Agent, or Firm* — Michael Best & Friedrich LLP

(57) ABSTRACT

A fan (20) comprises a fan hub (22), fan blades (24) which are mounted on the fan hub (22), and a drive motor having an outer rotor (30), wherein the outer rotor (30) is arranged inside the fan hub (22). The outer rotor (30) is arranged in the fan hub (22) in such a way that the outer rotor (30) is supported in a radially outward direction on the radial outer wall (36) of the fan hub (22), by means of cooling fins (32) which are formed integrally with the fan hub (22).

19 Claims, 7 Drawing Sheets

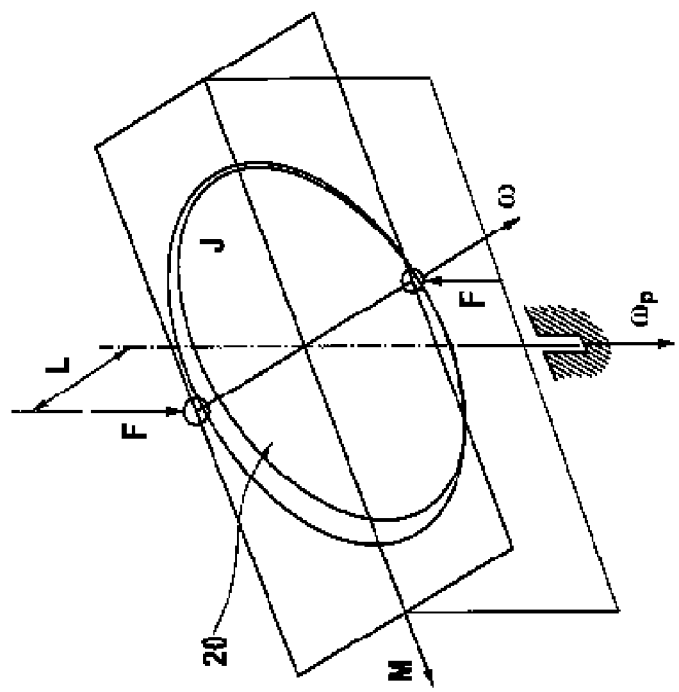
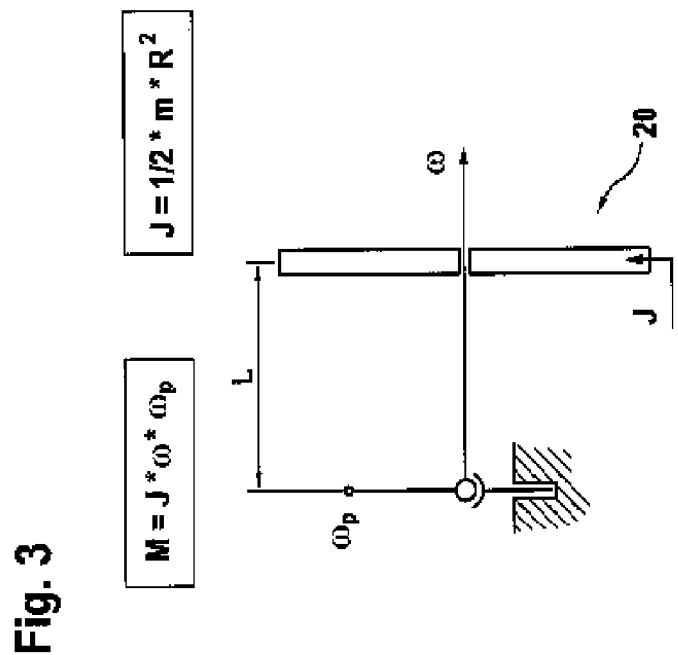
Fig. 3

FAN MODULE

BACKGROUND OF THE INVENTION

The invention generally relates to a fan for use in motor vehicles.

A cooling module is generally composed of an electric motor, a fan and a fan frame which surrounds the fan and the electric motor. The fan frame conducts the air which is sucked in by the fan and serves to attach the unit, composed of a fan and an electric motor, in, for example, an engine cavity of a motor vehicle.

During cornering of the motor vehicle, a tilting moment is applied to the rotating fan owing to the centrifugal forces. When the fan hub is configured, care is taken to ensure that collisions cannot occur between the fan and the fan frame during cornering. This is generally implemented by means of a stiff fan hub which reduces the tilting of the fan. Owing to the narrow installation spaces and the peripheral conditions for conducting the air flow, it is, however, difficult to effectively avoid tilting.

SUMMARY OF THE INVENTION

The object of the present invention is therefore to make available a fan in which the risk of collision between the rotating fan and the fan frame can be minimized even when strong centrifugal forces occur, with the result that the fan can be mounted at the smallest possible radial distance from adjacent components, such as, for example, a fan frame.

According to a first aspect, a fan is provided which comprises a fan hub, fan blades which are mounted on the fan hub, and a drive motor having an outer rotor, wherein the outer rotor is arranged inside the fan hub. In this context, the outer rotor is arranged in the fan hub in such a way that the outer rotor is supported in a radially outward direction on the radial outer wall of the fan hub, by means of cooling fins which are formed integrally with the fan hub.

The outer rotor therefore acts as a reinforcing insert in the fan hub, as a result of which the stiffness of the fan hub is increased and deformation of the fan hub during cornering can be reduced. The modulus of elasticity of the outer rotor is approximately 40 times the modulus of elasticity of the fan hub, with the result that the previously customary reinforcement fins in the radially inner region of the fan hub can be eliminated as a result of the inventive arrangement of the outer rotor in the fan hub, and nevertheless overall a significantly higher degree of rigidity of the fan hub is achieved.

As a result, with the fan according to the invention it is possible to prevent the fan blades or a fan belt which is arranged radially on the outside of the fan blades from coming into contact with adjacent components. The fan can therefore be mounted at a relatively small distance from adjacent components, as a result of which the available space for mounting the fan can be utilized better.

In this context, the outer rotor can comprise a multiplicity of magnets and a return ring. In order to achieve a particularly good connection between the outer rotor and the fan hub it is possible to provide that the outer rotor is integrated into the fan hub by injection molding. As a result, a stable, positively locking connection can be achieved between the fan hub and the outer rotor over the entire circumference of the outer rotor, with the result that, on the one hand, the outer rotor is securely mounted in the fan hub and, on the other hand, a high degree of rigidity of the fan hub with the outer rotor mounted therein is ensured.

The return ring of the outer rotor can be supported in a radially outward direction on the cooling fins of the fan hub. As a result, effective cooling of the outer rotor is ensured in the radially outward direction. Furthermore, deformation forces which act on the radially outer region of the fan hub are transmitted via the cooling fins to the outer rotor which, by virtue of its high degree of rigidity, reduces deformation of the radially outer region of the fan hub.

According to one embodiment is it possible to provide that in the region of the cooling fins at least one opening is provided in at least one wall of the fan hub, with the result that air can circulate past the cooling fins. This ensures that the outer rotor is sufficiently cooled while the fan is operating.

Furthermore it is possible to provide that the outer rotor can be connected to the cooling fins of the fan hub, in particular it is possible to provide that the outer rotor can be connected to the cooling fins in both the axial and radial directions. By means of a fixed connection between the outer rotor and the cooling fins of the fan hub it is possible to reduce deformation of the radially outer region of the fan hub, since forces acting on the fan hub can be transmitted uniformly to the outer rotor over the entire circumference.

According to one embodiment, the outer rotor comprises a multiplicity of magnets and a return ring, wherein the return ring can be connected to the cooling fins of the fan hub. As a result, the outer rotor can be reduced to a return ring and the magnets, and there is no need for any additional base of the outer rotor. As a result, the manufacture of the outer rotor can be simplified, and it is possible to ensure particularly good cooling of the return ring.

According to a further embodiment, the outer rotor comprises a multiplicity of magnets, a return ring and a base, wherein the base can be connected to the cooling fins of the fan hub. As a result, a connection between the outer rotor and the cooling fins can be brought about both in the radial and axial directions, as a result of which a particularly high degree of rigidity of the fan hub can be achieved.

By virtue of the fact that, as described above, the outer rotor reinforces the fan hub, it is possible to ensure that when the maximum loading which is provided during operation occurs in the radially outer region of the fan hub, said fan hub has a deformation of at maximum 0.2 mm, preferably a maximum of 0.08 mm. The maximum loading which is provided during operation is determined here on the basis of the maximum rotational speeds of the fan which are provided and the maximum centrifugal forces which occur owing to cornering, accelerating or decelerating of a motor vehicle in which the fan is mounted.

According to a further aspect, a cooling module is provided, comprising a fan as described above, a drive motor and a fan frame within which the fan is rotatably mounted, and by means of which the cooling module can be mounted in the vicinity of a component which is to be cooled.

According to a further aspect, a motor vehicle is provided which comprises a cooling module as described above.

BRIEF DESCRIPTION OF THE DRAWINGS

In the text which follows, embodiments of the present invention are explained in more detail with reference to the appended drawings, in which:

FIG. 3 shows a schematic illustration clarifying the centrifugal forces which occur;

DETAILED DESCRIPTION

Figure 1:
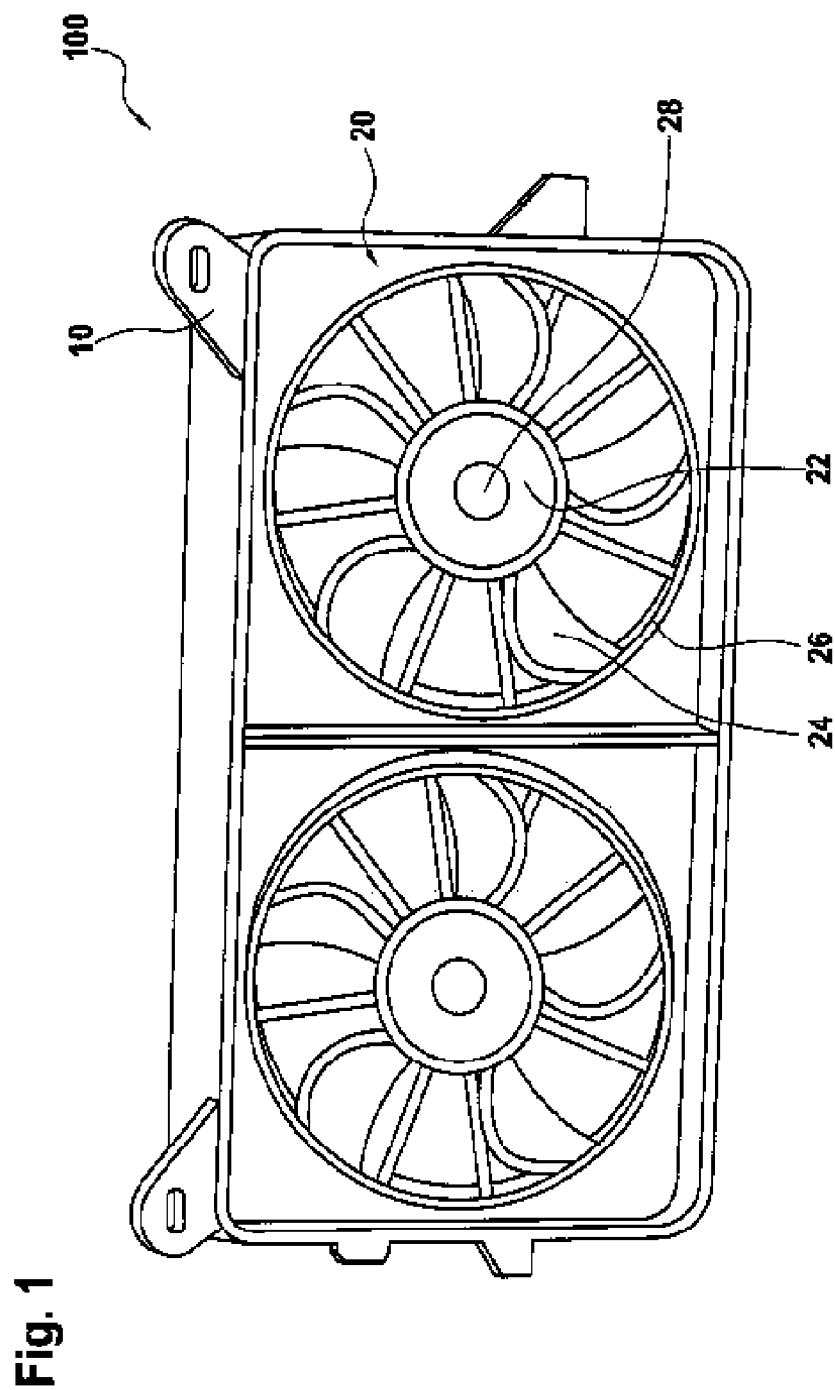
FIG. 1 shows a cooling module corresponding to an embodiment of the present invention.

As shown in FIG. 1, a cooling module 100 comprises a fan 20, which is rotatably mounted in a fan frame 10. The cooling module 100 may, for example, be mounted in the engine cavity of a motor vehicle. The fan 20 comprises a fan hub 22, a multiplicity of fan blades 24 and a fan belt 26.

Figure 2:
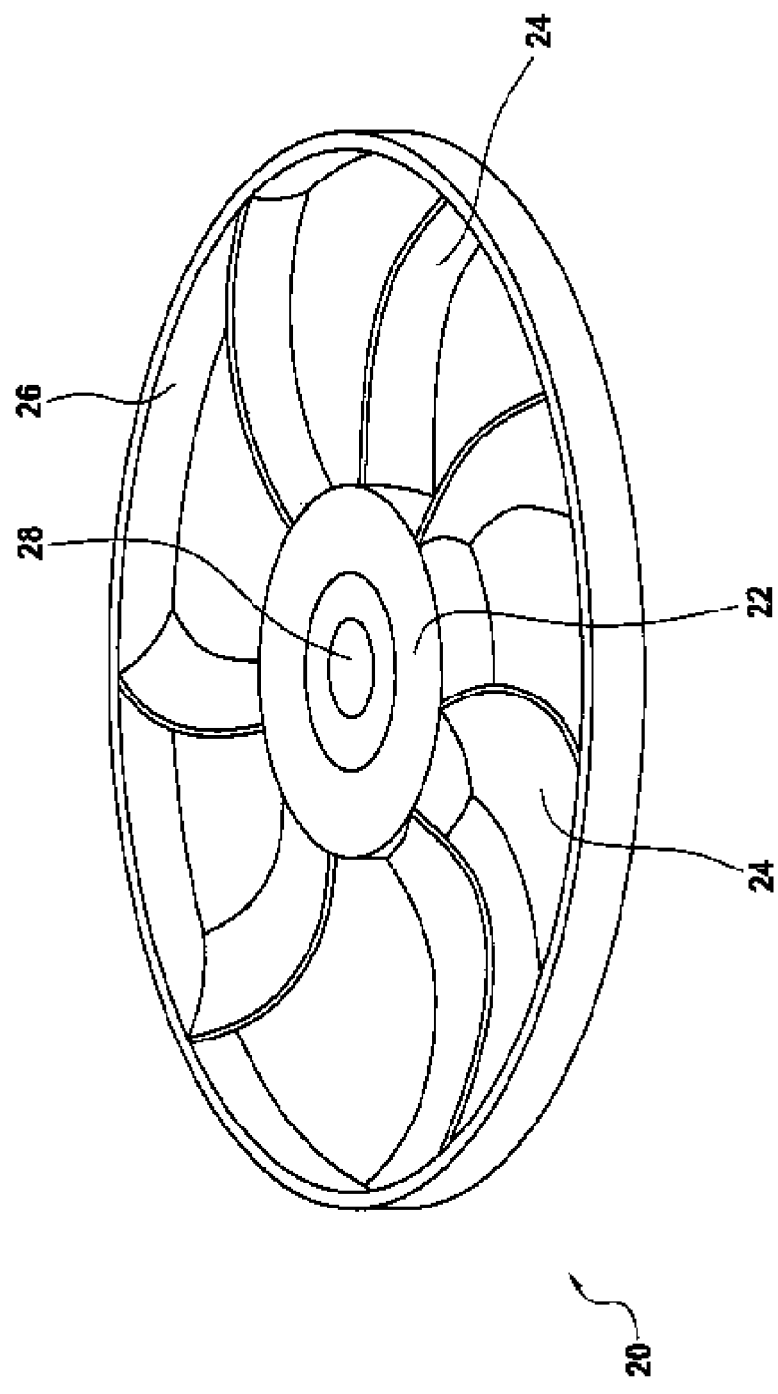
FIG. 2 shows a perspective view of the fan which is installed in the cooling module shown in FIG. 1.

As illustrated in FIG. 2, the fan blades 24 are arranged radially on the outside of the fan hub 22, and the fan belt 26 connects the respective radially outer ends of the fan blades 24. A shaft bushing 28, by means of which the fan hub 22 is rotatably mounted on a shaft (not shown), is arranged radially on the inside of the fan hub 22. The fan is driven by means of an electric motor, wherein the stator is fixedly mounted on the shaft, and the outer rotor 30 (see FIGS. 6 and 7) is arranged in the fan hub 22 and is fixedly connected thereto.

FIG. 1 shows that there is a narrow gap between the fan belt 26 and the fan frame 10 in order to prevent a collision between the rotating fan 20 and the fixed fan frame 10.

If the fan frame 10 is mounted, for example, in an engine cavity of a motor vehicle, during operation of the fan 20 not only forces resulting directly from the rotation of the fan 20 about its axis occur, but also centrifugal forces owing to lateral accelerations, for example owing to cornering of the motor vehicle or owing to accelerations or decelerations of the motor vehicle depending on the installation direction of the fan relative to the direction of travel. These centrifugal forces bring about tilting of the fan 20, with the result that the fan hub 22 is deformed. This deformation can lead to a collision between the fan belt 28 and the fan frame 10.

In order to avoid such a collision, the distance between the fan frame 10 and the fan belt 28 can be enlarged. However, the available space then cannot be used in an optimum way and the cooling power of the fan 20 is possibly not sufficient. For this reason, in the fan 20 according to the invention the fan hub 22 is embodied in a particularly rigid fashion, with the result that deformation of the fan hub 22 can be reduced and thus a collision of the fan belt 28 with the fan frame 10 can also be prevented when the fan 20 utilizes the existing space in the best way possible.

Figure 4:
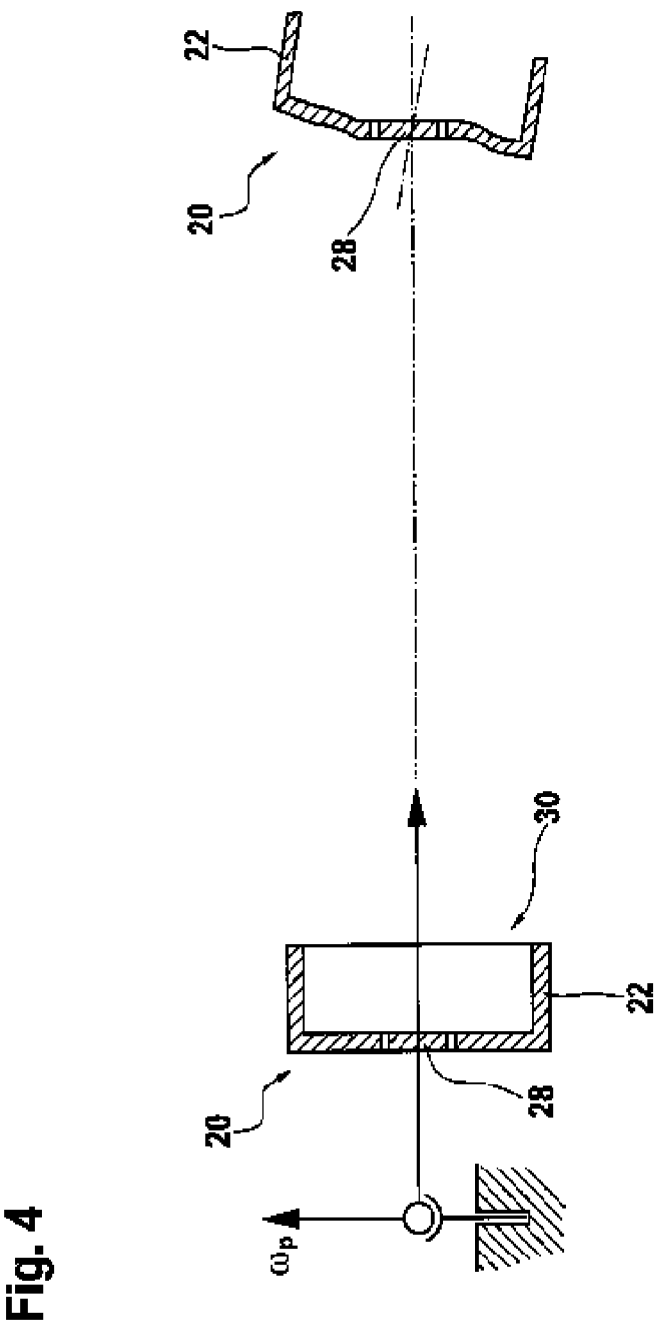
FIG. 4 shows a schematic illustration explaining the tilting of a fan hub which is not sufficiently reinforced, owing to a gyroscopic torque.

FIGS. 3 and 4 illustrate the forces which occur when the fan 20 is forced to rotate about an axis which is not a main axis of the fan. In this context, ω is the angular speed of the fan and $\omega_P$ is the cornering speed of the vehicle about a rotational axis, which runs perpendicularly to the rotational axis of the fan in the present example. The fan 20 attempts to move at a right angle away from the rotation owing to the cornering and generates a gyroscopic torque which is absorbed by deformation of the fan 20, and in particular by deformation in the base region of the fan hub 22.

If the rotational axis of the cornering is perpendicular to the rotational axis of the fan 20, the gyroscopic torque M can be determined by $$M = J * \omega * \omega_P \qquad 1.$$

where the moment of inertia J for an approximately cylindrical fan is determined by $$J = \frac{1}{2} * m * R^2 \qquad 1.$$

where m is the mass and R is the radius of the fan 20.

As is shown in the right-hand part of FIG. 4, the gyroscopic torque which acts on the fan 20 brings about a deformation in the base region of the fan hub 22. If an outer rotor 30 is, as indicated in FIG. 4, arranged in the radially inner region of the fan hub 22, the deformation occurs, as shown in the right-hand part of FIG. 4, mainly in the regions of the fan hub which are located radially outside the outer rotor 30.

Figure 5:
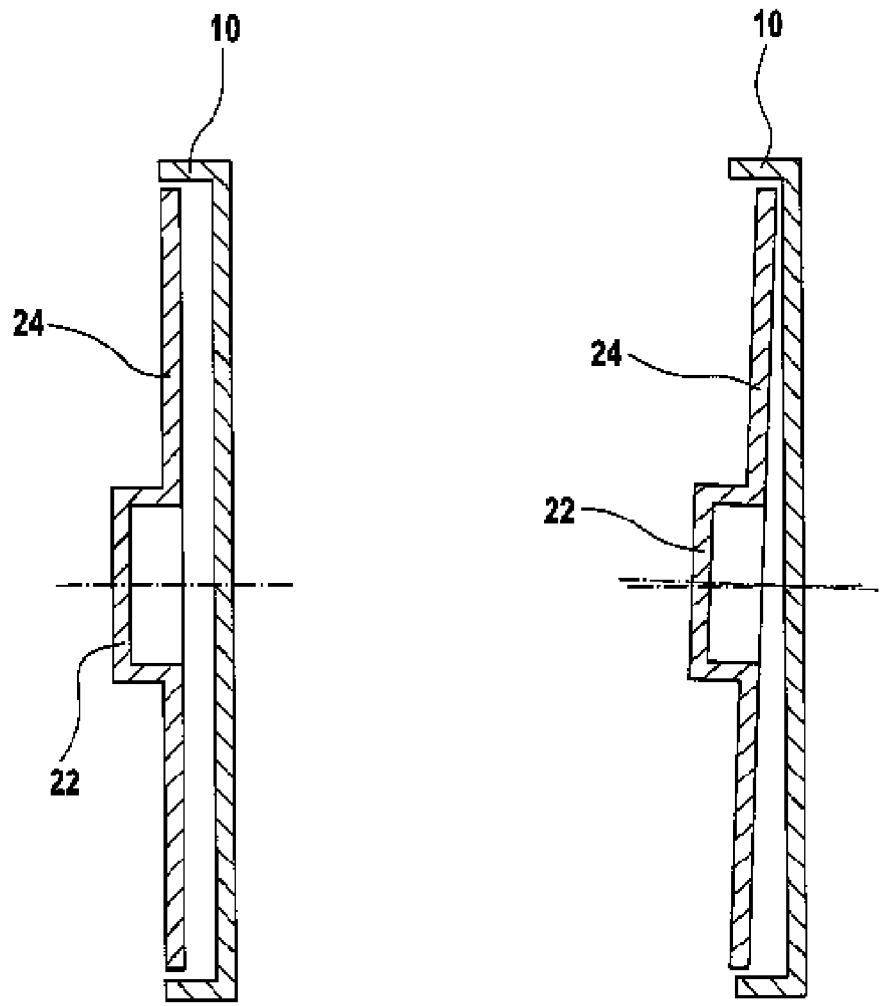
FIG. 5 shows a schematic illustration explaining the risk of collision between a fan belt and fan frame during the tilting shown in FIG. 4.

As shown in FIG. 5, this deformation brings about an angular offset of the radial outer regions of the fan 20 with respect to the fan frame 10, with the result that the fan belt 26 or the fan blades 24 can collide with the fan frame 10.

A fan hub 22 which is not reinforced has a relatively small modulus of elasticity of approximately 5000 MPa. For this reason, a non-reinforced fan hub is deformed to a relatively high degree by gyroscopic torques occurring during cornering. Generally, the bending $W_A$ of the hub is determined by $$W_A = (F * r^3)/(3 * E * 1) \qquad (a)$$

where F is the applied force, r is the radius of the fan hub 22, E is the modulus of elasticity of the fan hub 22, and 1 is the planar moment of inertia of the fan hub 22.

Figure 6:
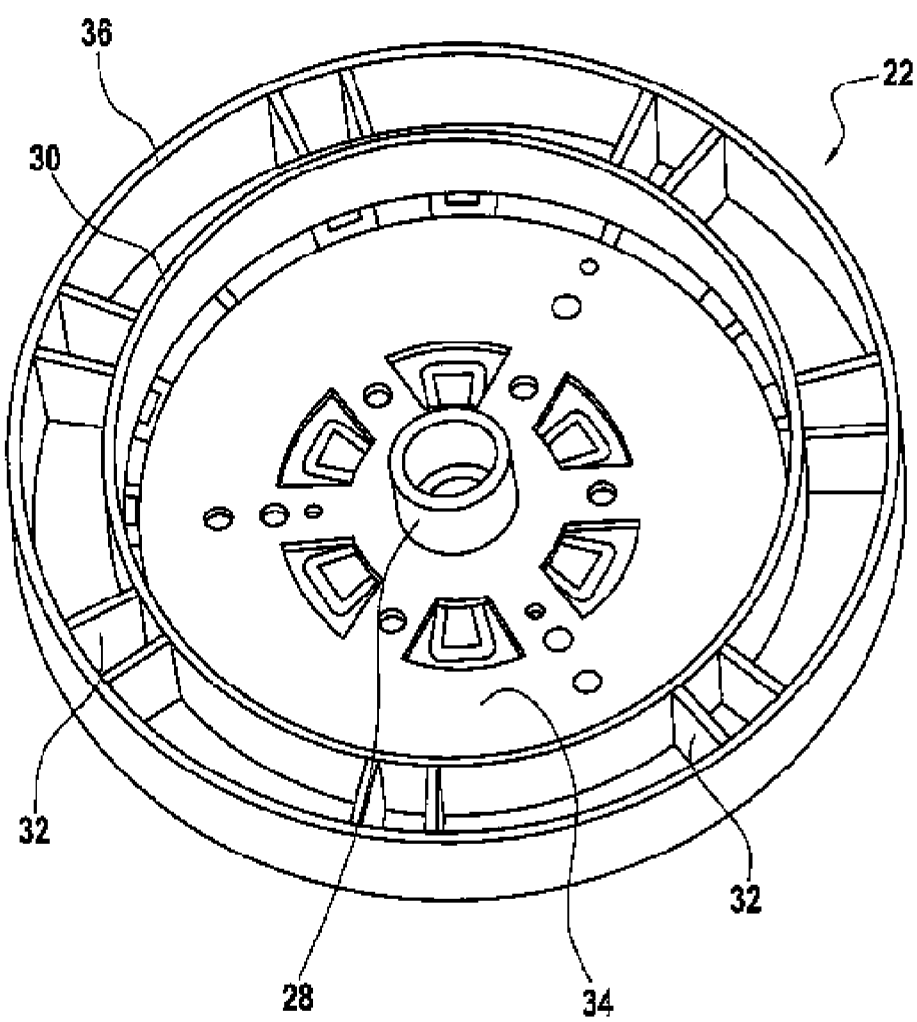
FIG. 6 shows a view of the hub of a fan shown in FIG. 2 with the fan blades omitted.

In the embodiment shown, the modulus of elasticity E of the fan hub 22 is increased by virtue of the fact that, as shown in FIG. 6, the outer rotor 30 is inserted into the fan hub 22. In order to increase the rigidity effectively, the outer rotor 30 must be mounted as far in the radially outer direction on the fan hub 22 as possible in order to minimize the deformation, shown in FIG. 4, of the radial outer region of the fan hub 22.

However, on the other hand, the outer rotor 30 must be sufficiently cooled during operation. As a result it is not possible to arrange the outer rotor 30 so that it bears directly against the radial outer wall 36 of the fan hub 22 but instead it is necessary for air to be able to circulate around the outer rotor 30. For this reason, in the present invention cooling fins 32 are provided between the outer rotor 30 and the radial outer wall 36 of the fan hub 22.

For a particularly good connection between the fan hub 22 and the outer rotor 30 it is possible for the latter to be integrated with the fan hub 22 by means of injection molding. The injection molding of the outer rotor 30 into the fan hub 22 increases the modulus of elasticity of the latter, from approximately 5000 MPa to 210 000 MPa.

In order to effectively reduce the risk of collision between the fan belt 26 and the fan frame 10, it is necessary to reinforce the fan hub in such a way that the bending in the radial outer region of the fan 20 is ≤2 mm owing to the resilience of the fan hub (see FIG. 5). As a result of the outer rotor 30 being connected to the fan hub 22 over a large area in the present invention and as a result of the fact that the modulus of elasticity of the outer rotor 30 is approximately 40 times the modulus of elasticity of the hub material (210 000 MPa as against 5000 MPa), the resilience of the hub is reduced to approximately 0.08 mm. This is sufficient to greatly reduce the risk of collision compared to a conventional fan hub. Further reinforcement fins in the fan hub 22 are then superfluous and can be eliminated.

Two variants are available with respect to the insertion of the outer rotor 30 in the fan hub 22.

Figure 7:
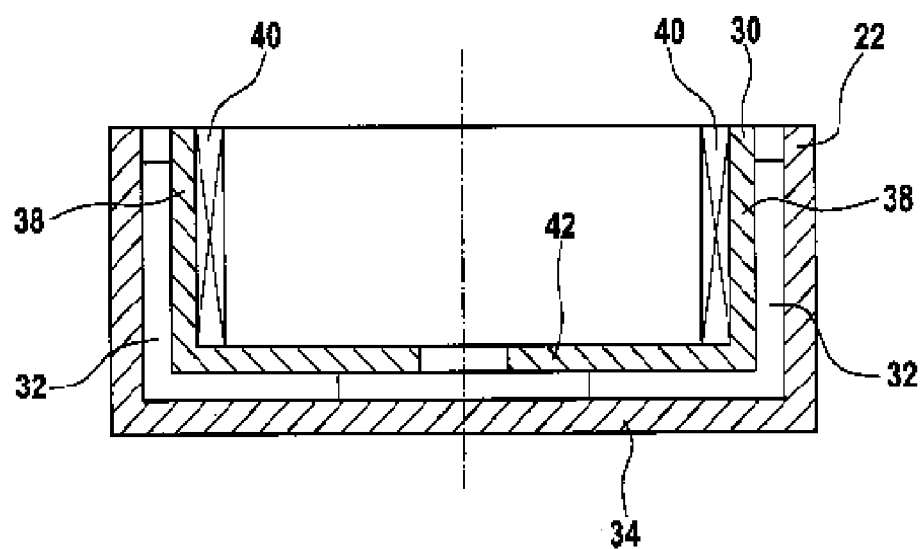
FIG. 7 shows a schematic sectional view of a fan hub according to a first variant of the present invention.

The first variant is shown in FIG. 7. Here, the outer rotor 30 comprises a return ring 38, a multiplicity of magnets 40 and a base 42. The return ring 38 and the base 42 can be embodied here in one piece as a deep-drawn piece of sheet metal. The cooling fins 32 are arranged here both between the radial outer wall 36 of the fan hub 22 and the return ring 38 of the outer rotor 30 and between the base 34 of the fan hub 22 and the base 42 of the outer rotor 30, with the result that air can circulate around the outer rotor 30. The outer rotor 30 is connected via its return ring 38 and its base 42 to the cooling fins 32 in both the axial and radial directions, with the result that particularly good attachment of the outer rotor 30 in the fan hub 22 is ensured.

In the second variant, the base 42 of the outer rotor 30 is eliminated and the outer rotor 30 is therefore reduced to a return ring 38 and a multiplicity of magnets 40. The connection between the outer rotor 30 and the fan hub 22 is also implemented by means of the cooling fins 32, wherein in this variant the outer rotor 30 can only be supported on the cooling fins 32, and attach thereto, in the radial direction. As compensation for this, the second variant permits improved cooling of the outer rotor 30 compared to the first variant, since the air circulation about the magnets 40 and the return ring 38 is improved.

In both variants, additional ventilation openings can be provided for improved air circulation in the base 34 of the fan hub 22.

The invention claimed is:

1. A fan (20), comprising:
a fan hub (22),
fan blades (24) which are mounted on the fan hub (22), and
a drive motor having an outer rotor (30), wherein the outer rotor (30) is arranged inside the fan hub (22),
characterized in that
the outer rotor (30) is arranged in the fan hub (22) in such a way that the outer rotor (30) is supported in a radially outward direction on a radial outer wall (36) of the fan hub (22) by cooling fins (32) which are formed integrally with the fan hub (22), wherein a return ring (38) of the outer rotor (30) is supported in a radially outward direction on the cooling fins (32) of the fan hub (22).

2. The fan (20) according to claim 1, characterized in that the outer rotor (30) also comprises a multiplicity of magnets (40), and in that the outer rotor (30) is integrated into the fan hub (22) by injection molding.

3. The fan (20) according to claim 1, characterized in that in a region of the cooling fins (32) at least one opening is provided in at least one wall of the fan hub (22), such that air can circulate past the cooling fins (32).

4. The fan (20) according to claim 1, characterized in that the outer rotor (30) also comprises a multiplicity of magnets (40).

5. The fan (20) according to claim 1, characterized in that the outer rotor (30) also comprises a multiplicity of magnets (40), and a base (42), wherein the base (42) is configured to be connected to the cooling fins (32) of the fan hub (22).

6. The fan (20) according to claim 1, characterized in that, when a maximum loading which is provided during operation occurs in a radially outer region of the fan hub (22), said fan hub (22) has a deformation of at maximum 0.2 mm.

7. A cooling module (100), comprising a fan (20) according to claim 1, a drive motor and a fan frame (10) within which the fan (20) is rotatably mounted, and by which the cooling module (100) can be mounted in the vicinity of a component which is to be cooled.

8. A motor vehicle, comprising a cooling module (100) according to claim 7.

9. The fan (20) according to claim 1, characterized in that, when a maximum loading which is provided during operation occurs in a radially outer region of the fan hub (22), said fan hub (22) has a deformation of a maximum of 0.08 mm.

10. The fan (20) according to claim 1, wherein the cooling fins are arranged both between the radial outer wall of the fan hub and the return ring of the outer rotor and between a base of the fan hub and a base of the outer rotor.

11. The fan (20) according to claim 1, wherein outer rotor is connected via the return ring and a base of the outer rotor to the cooling fins in both radial and axial directions.

12. A fan (20), comprising:
a fan hub (22),
fan blades (24) which are mounted on the fan hub (22), and
a drive motor having an outer rotor (30), wherein the outer rotor (30) is arranged inside the fan hub (22),
characterized in that
the outer rotor (30) is arranged in the fan hub (22) in such a way that the outer rotor (30) is supported in a radially outward direction on a radial outer wall (36) of the fan hub (22) by cooling fins (32) which are formed integrally with the fan hub (22), and wherein, when a maximum loading which is provided during operation occurs in a radially outer region of the fan hub (22), said fan hub (22) has a deformation of at maximum 0.2 mm.

13. The fan (20) according to claim 12, characterized in that the outer rotor (30) also comprises a multiplicity of magnets (40) and a return ring (38).

14. The fan (20) according to claim 13, wherein the cooling fins are arranged both between the radial outer wall of the fan hub and a return ring of the outer rotor and between a base of the fan hub and a base of the outer rotor.

15. The fan (20) according to claim 13, wherein outer rotor is connected via the return ring of the outer rotor and a base of the outer rotor to the cooling fins in both radial and axial directions.

16. A fan (20), comprising:
a fan hub (22),
fan blades (24) which are mounted on the fan hub (22), and
a drive motor having an outer rotor (30), wherein the outer rotor (30) is arranged inside the fan hub (22),
characterized in that
the outer rotor (30) is arranged in the fan hub (22) in such a way that the outer rotor (30) is supported in a radially outward direction on a radial outer wall (36) of the fan hub (22) by cooling fins (32) which are formed integrally with the fan hub (22), and wherein, when a maximum loading which is provided during operation occurs in a radially outer region of the fan hub (22), said fan hub (22) has a deformation of a maximum of 0.08 mm.

17. The fan (20) according to claim 16, characterized in that the outer rotor (30) also comprises a multiplicity of magnets (40) and a return ring (38).

18. The fan (20) according to claim 17, wherein the cooling fins are arranged both between the radial outer wall of the fan hub and a return ring of the outer rotor and between a base of the fan hub and a base of the outer rotor.

19. The fan (20) according to claim 17, wherein outer rotor is connected via a return ring of the outer rotor and a base of the outer rotor to the cooling fins in both radial and axial directions.

* * * * *